Feb. 2, 1954
T. A. RICH
2,668,245
RADIATION MONITOR
Filed Oct. 31, 1950
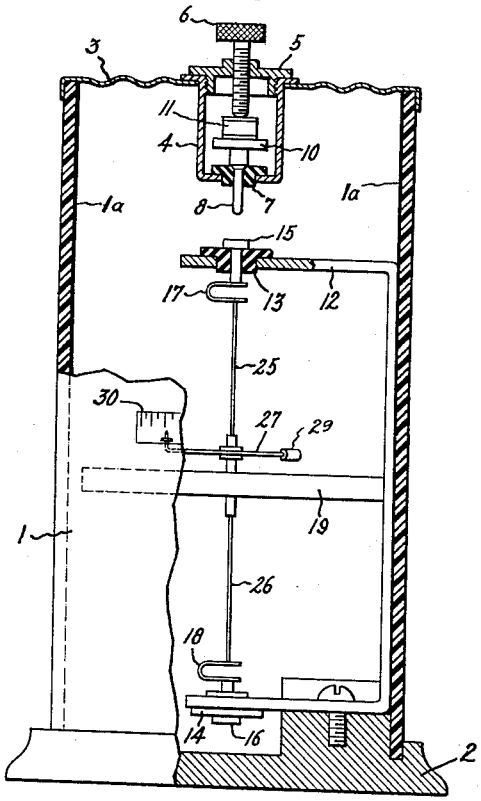
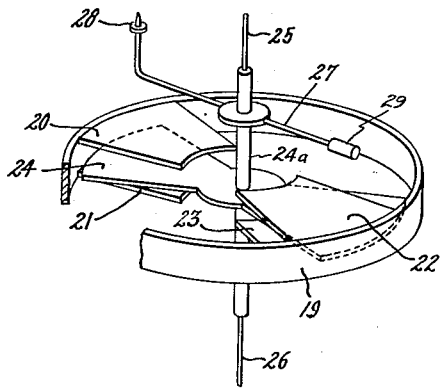
Inventor:
Theodore A. Rich,
by Paul A. Frank
His Attorney.

Patented Feb. 2, 1954

2,668,245

UNITED STATES PATENT OFFICE 2,668,245

RADIATION MONITOR

Theodore A. Rich, Schenectady, N. Y., assignor to General Electric Company, a corporation of New York Application October 31, 1950, Serial No. 193,227

7 Claims. (Cl. 250—83.6)

My invention relates to radiation monitors and, more particularly, to portable radiation monitors employing a charged electrostatic measuring device mounted within an ion chamber in combination with a normally inert electro-mechanical charging apparatus for charging the measuring device upon the same becoming discharged, the charging apparatus being mounted on and transportable with the ion chamber.

It is therefore an object of my invention to provide a dependable, accurate, and yet inexpensive device for indicating the presence of radioactivity in small amounts.

It is another object of my invention to provide a portable device for indicating the presence of radioactivity in small amounts.

It is another object of my invention to provide an accurate and dependable device for measuring radioactivity which may be operated by inexperienced personnel.

It is a further object of my invention to provide a radiation monitor which is of dependable and sturdy construction which contains no parts which will wear out and is thus always ready for use to indicate radioactivity in small amounts.

In the attainment of the foregoing objects, I provide a radiation monitor employing a charged electrostatic measuring device mounted within a portable ion chamber. When the atmosphere within the chamber is traversed by gamma rays, electrons and positive ions are produced which neutralize the charge on the electrostatic measuring device. To initially charge the electrometer, I provide a simple, foolproof arrangement comprising a normally inert electro-mechanical transducing apparatus for converting mechanical energy to electrical energy. The electro-mechanical charging apparatus is mounted on the housing of the ion chamber, and means are provided for selectively impressing the electric potential developed thereby on the electrostatic measuring device to charge the same to a desired electric potential.

For further objects and advantages and for a better understanding of my invention, attention is now directed to the following description and accompanying drawing and also to the appended claims. In the drawing, Fig. 1 is a cutaway view of a radiation monitor; and Fig. 2 is a cutaway view of the rotating parts of the binant electrometer employed in the monitor of Fig. 1.

Referring to Fig. 1, a portable housing defining an ionization chamber is shown, and comprising a vertical cylindrical plastic envelope 1 which is coated on the inner surface of a relatively rigid wall portion thereof with a conducting layer, for example aquadag, and is supported at the base in a mounting 2. The housing further includes a flexible wall portion that comprises a conducting diaphragm 3 which is fastened over an opening in the top of the housing, and which is part of the charging circuit particularly concerned with herein.

Diaphragm 3, which is a conductor of electrostatic charge, is provided at its center with a circular opening in which an electro-mechanical transducing apparatus for converting mechanical energy to electrical energy, is mounted. The electro-mechanical transducing apparatus is preferably of the electrostrictive charging type, and may comprise a rigid cylindrically shaped can 4 which has fastened over the top by suitable means, such for example, as a matching thread as shown in the drawing, a cover plate 5 which is provided through its center with a threaded circular opening. A thumbscrew 6 is located in the opening of member 5. Can 4 has mounted in its bottom an insulating bushing 7 which is provided with a circular opening through which is inserted a metallic member 8 having a head 9 upon which is located a table 10. A disk of a material of high piezoelectric coefficient and having opposite faces thereof coated with a metallic layer is located on table 10 such that one of the coated faces rests upon the table and such that the end of thumbscrew 6 contacts the other metallically coated face when screw 6 is inserted through opening 5.

The radiation measuring instrument comprising the present invention further includes an electrostatic measuring device that is supported within the ionization chamber defined by housing members 1, 2, and 3. The electrostatic measuring device preferably comprises a binant electrometer assembly that is supported within the ionization chamber by a C-shaped bracket 12 rigidly mounted on support 2, and provided with circular openings in the ends of the legs thereof. The bracket is located in a position such that these openings coincide with the longitudinal axis of cylinder 1. A pair of insulating bushings 13 and 14, provided with holes through their centers, are mounted in the openings in bracket 12 and metallic members 15 and 16 which are located in the holes of insulators 13 and 16 have mounted thereon flat springs 17 and 18. The binant electrometer, which includes a metallic supporting ring 19, is also mounted on bracket 12, and has four stationary blade-like plate elements or electrodes 20, 21, 22 and 23 protruding inwardly from the sides of the ring. Electrodes 20 and 22 are located diametrically opposite one another and extend from the top of ring 19, and electrodes 21 and 23 extend from the bottom of the ring directly beneath blades 20 and 22. A thin S-shaped, conducting plate element or vane 24, that is very light in weight, is mounted on a shaft 24a supported by suspensions 25 and 26 in a manner such that it parallels the planes of the stationary blades and lies midway between blades 20 and 22. Suspensions 25 and 26 are fastened by suitable means to springs 17 and 18, respectively. A pointer having a very small weight is mounted on shaft 24a and has a thin mica button 28 located at one end as an indicator and a counterweight 29 located at the opposite end.

In operation, the monitor is placed in an area in which it is desired to measure the radioactivity and diaphragm 3 is pressed down until member 8 makes contact with metallic support 15 which impresses the voltage across disk 11 between the stationary electrodes and movable vane 24. The electrometer is charged by tightening thumbscrew 6 down on disk 11, which, as known in the art, develops a voltage across the opposite plates of the disk. Consequently, table 10 and its supports 9 and 8 may be at a higher potential than is screw 6 and electrodes 20, 21, 22, and 23, which are electrically connected to screw 6. The pressure is gradually increased until the pointer 28 indicates zero, which is substantially the position shown in Fig. 1. The mechanical zero of the device (the uncharged position) is approximately 80 degrees from this point in a counterclockwise direction. When the pressure on diaphragm 3 is removed, it goes back into its original position and member 8 is separated from support 15. Consequently, the voltage remains between vane 24 and stationary electrodes 20, 21, 22, and 23, and the device is ready to measure radiation. The pressure on the barium titanate is then released and the device is in an operative condition. A simple, yet everlasting means for charging the electrometer is thus provided.

As the radiation impinges on cylinder 1, any alpha and beta particles are absorbed by the plastic and the conducting coating and only gamma rays penetrate to the atmosphere within the chamber. Because the inner walls of cylinder 1 and, consequently, bracket 12, and the metallic ring 19 and its associated stationary electrodes 20, 21, 22, and 23 are charged to say a negative potential with respect to vane 24 and an electric field exists within the chamber. As the gamma rays strike the molecules of the atmosphere, ionization takes place and the electrons, thus freed, travel against the electric field and strike suspensions 25 or 26 or vane 24. At the same time, the positive ions travel to the walls of cylinder 1 or some other positive point, such, for example, as diaphragm 3 or bracket 12, and the charge on the vane and the electrodes is neutralized to an extent determined by the amount of gamma rays which have traversed the chamber. As the charge on the moving vane and the stationary electrodes is neutralized, the torque holding the blades is reduced and vane 24 moves out of the stationary blades toward the uncharged or mechanical zero position. The polarity of the charge could, of course, be reversed without adverse effect. Pointer 28 thus indicates a value corresponding to the amount of radiation on a scale 30 located on the side of cylinder 1. As is known in the art, this scale may be calibrated in Roentgen units. The scale reading at any time shows the amount of radiation received since the device was last charged. Such a device would be normally be recharged daily and in this time the amount of leakage across insulators 13 and 14 can be made negligible. A typical instrument might require a charge of 300 volts to bring it to indicate zero milliroentgens and by proper shaping of the plates would give a substantially uniform scale. The full scale value for a volume of one liter would be in the neighborhood of 10 mv. which would correspond to a residual charge of 100 volts. By changing the volume or the electrical capacity, the full scale value may be selected over wide limits. The sensitivity is thus more than adequate since 100 mv. per day is considered to be nonhazardous.

While this invention has been described by a particular embodiment thereof, it will be understood that those skilled in the art may make many changes and modifications without departing from the invention. Therefore, by the appended claims, I intend to cover any such modifications which fall within the true spirit and scope of this invention.

What I claim as new and desire to secure by Letters Patent of the United States is:

1. An instrument for indicating and measuring ionizing radiations including in combination an ionization chamber, an electrostatic measuring device supported within said ionization chamber, a normally inert electro-mechanical charging apparatus mounted on the housing of said ionization chamber, and selectively operable switching means for selectively coupling the output of said electro-mechanical charging apparatus to said electrostatic measuring device to charge the same to a desired electric potential.

2. An instrument for indicating and measuring ionizing radiations including in combination a housing defining an ionization chamber, an electrostatic measuring device secured within said ionization chamber, a normally inert electro-mechanical electric potential charging apparatus mounted on the housing of said ionization chamber, said charging apparatus being normally electrically disconnected from said electrostatic measuring device, and means supported by the housing of said ionization chamber for selectively connecting the output of said electro-mechanical charging apparatus to said electrostatic measuring device.

3. An instrument for indicating and measuring ionizing radiations including in combination a portable housing defining an ionization chamber, an electrostatic measuring device secured within said ionization chamber, a normally inert electro-mechanical transducing apparatus for converting mechanical energy to electrical energy, said electro-mechanical transducing apparatus being mounted on the housing of said ionization chamber and being normally electrically disconnected from said electrostatic measuring device, and mechanically movable switching means supported by the housing of said ionization chamber for operatively connecting the output of said electro-mechanical transducing apparatus to said electrostatic measuring device for selectively charging the same to a desired electric potential.

4. An instrument for indicating and measuring ionizing radiations including in combination an iozation chamber, an electrostatic measuring device supported within said ionization chamber, an electrostrictive charging apparatus mounted on the housing of said ionization chamber, and means supported by the housing of said ionization chamber for operatively coupling the output of said electrostrictive charging apparatus to said electrostatic measuring device for selectively charging the same to a desired electric potential.

5. An instrument for indicating and measuring ionizing radiations including in combination a housing defining an ionization chamber, an electrometer measuring device secured within said ionization chamber a piezoelectric charging apparatus mounted on said housing, and movable switching means supported by said housing for selectively connecting the output of said piezoelectric charging apparatus to said electrometer measuring device for selectively charging the same to a desired electric potential.

6. An instrument for indicating and measuring ionizing radiations including in combination a housing defining an ionization chamber, an electrometer measuring device supported within said ionization chamber, and comprising fixed and movable plate elements, a piezoelectric charging apparatus mounted on said housing, movable switching means supported by said housing for selectively connecting the output of said piezoelectric charging apparatus between the fixed and movable plate elements of said electrometer measuring device for selectively charging the same to a desired electric potential, and indicating means secured to said movable plate element for producing an observable indication of the ionizing radiations reaching said instrument.

7. An instrument for indicating and measuring ionizing radiations including in combination a portable housing defining an ionization chamber and including a relatively rigid non-conducting wall portion with an electrically conductive surface on the interior thereof and a flexible electrically conductive wall portion contacting the conductive surface of said relatively rigid wall portion, an electrometer measuring device including a set of oppositely disposed pairs of spaced apart fixed plate elements secured to the electrically conductive interior of the relatively rigid wall portion of said housing within said ionization chamber, and a movable plate element likewise supported within said ionization chamber movably disposed between the spaced apart pairs of said fixed plate elements, a piezoelectric charging apparatus secured to said flexible wall portion with one piezo-active face thereof electrically connected to said flexible wall portion, an electrically conductive torsional suspension for movably supporting the plate element of said electrometer measuring device within the ionization chamber and between the pairs of fixed plate elements, one end of said torsional suspension being operatively connectable to the remaining piezo-active face of said piezoelectric charging device upon said flexible wall portion being flexed inwardly into said ionization chamber, and indicating means secured to said movable plate element for producing an observable indication of the ionizing radiations reaching said instrument.

THEODORE A. RICH.

References Cited in the file of this patent

UNITED STATES PATENTS

| Number | Name | Date |
|---|---|---|
| 1,855,669 | Glasser et al. | Apr. 26, 1932 |
| 2,168,464 | Yeda | Aug. 8, 1939 |
| 2,503,831 | Mason | Apr. 11, 1950 |
| 2,516,984 | Havenhill et al. | Aug. 1, 1950 |

OTHER REFERENCES

Procedures in Experimental Physics, Strong, 1938, published by Prentice-Hall, Inc., New York, pages 232, 244, 245.